United States Patent
Huang et al.

(10) Patent No.: US 9,830,404 B2
(45) Date of Patent: Nov. 28, 2017

(54) ANALYZING LANGUAGE DEPENDENCY STRUCTURES

(71) Applicant: Facebook, Inc., Menlo Park, CA (US)

(72) Inventors: Fei Huang, Boonton, NJ (US); Kay Rottmann, San Francisco, CA (US); Ying Zhang, Turlock, CA (US); Matthias Gerhard Eck, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 122 days.

(21) Appl. No.: 14/586,074

(22) Filed: Dec. 30, 2014

(65) Prior Publication Data
US 2016/0188661 A1    Jun. 30, 2016

(51) Int. Cl.
*G06F 17/30* (2006.01)

(52) U.S. Cl.
CPC .. *G06F 17/30991* (2013.01); *G06F 17/30979* (2013.01)

(58) Field of Classification Search
USPC ................ 707/769, 736, 750, 749
See application file for complete search history.

(56) References Cited

U.S. PATENT DOCUMENTS

| | | | |
|---|---|---|---|
| 5,293,581 A | 3/1994 | DiMarco et al. | |
| 5,477,451 A | 12/1995 | Brown et al. | |
| 5,510,981 A | 4/1996 | Berger et al. | |
| 5,799,193 A | 8/1998 | Sherman et al. | |
| 5,991,710 A | 11/1999 | Papineni et al. | |
| 6,002,998 A | 12/1999 | Martino et al. | |
| 6,157,905 A | 12/2000 | Powell | |
| 6,161,082 A | 12/2000 | Goldberg | |
| 6,223,150 B1 | 4/2001 | Duan et al. | |
| 6,266,642 B1 | 7/2001 | Franz et al. | |
| 6,304,841 B1 | 10/2001 | Berger et al. | |
| 6,377,925 B1 | 4/2002 | Newman et al. | |
| 6,393,389 B1 | 5/2002 | Chanod et al. | |
| 6,629,095 B1 | 9/2003 | Wagstaff et al. | |
| 7,054,804 B2 | 5/2006 | Gonzales et al. | |
| 7,110,938 B1 | 9/2006 | Cheng et al. | |
| 7,359,861 B2 | 4/2008 | Lee et al. | |
| 7,533,019 B1 | 5/2009 | Riccardi et al. | |
| 7,664,629 B2 | 2/2010 | Dymetman et al. | |

(Continued)

OTHER PUBLICATIONS

U.S. Appl. No. 14/586,049, by Huang et al., filed Dec. 30, 2014.

(Continued)

*Primary Examiner* — Hung T Vy
(74) *Attorney, Agent, or Firm* — Perkins Coie LLP

(57) ABSTRACT

Technology is discussed herein for identifying trending actions within a group of posts matching a query. A group of posts can be selected based on specified actions, action targets, or parameters such as author age, location, gender, when the posts were posted or what keywords they contain. Selected posts can be divided into sentences and a dependency structure can be created for each sentence classifying portions of the sentence as actions or action targets. Statistics can be generated for each sentence or post indicating whether it matches the actions, action targets, or other parameters specified in the query. Based on these statistics, additional information can be gathered to respond to questions posed in the query.

20 Claims, 6 Drawing Sheets

(56) References Cited

U.S. PATENT DOCUMENTS

| | | |
|---|---|---|
| 7,813,918 B2 | 10/2010 | Muslea et al. |
| 7,827,026 B2 | 11/2010 | Brun et al. |
| 7,895,030 B2 | 2/2011 | Al-Onaizan et al. |
| 7,983,903 B2 | 7/2011 | Gao et al. |
| 8,015,140 B2 | 9/2011 | Kumar et al. |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 * | 6/2012 | Hubbard ............... G06Q 30/02 705/14.52 |
| 8,265,923 B2 | 9/2012 | Chatterjee et al. |
| 8,275,602 B2 | 9/2012 | Curry et al. |
| 8,386,235 B2 | 2/2013 | Duan et al. |
| 8,543,580 B2 | 9/2013 | Chen et al. |
| 8,756,050 B1 | 6/2014 | Curtis et al. |
| 8,825,466 B1 | 9/2014 | Wang et al. |
| 8,825,759 B1 * | 9/2014 | Jackson ................. H04L 67/02 705/14.69 |
| 8,831,928 B2 | 9/2014 | Marcu et al. |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 * | 3/2015 | Jackson ............ G06F 17/30699 707/748 |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,009,025 B1 | 4/2015 | Porter et al. |
| 9,031,829 B2 | 5/2015 | Leydon et al. |
| 9,104,661 B1 | 8/2015 | Evans |
| 9,183,309 B2 * | 11/2015 | Gupta ............... G06F 17/30867 |
| 9,231,898 B2 | 1/2016 | Orsini et al. |
| 9,245,278 B2 | 1/2016 | Orsini et al. |
| 9,336,206 B1 | 5/2016 | Orsini et al. |
| 9,477,652 B2 | 10/2016 | Huang et al. |
| 9,734,142 B2 | 8/2017 | Huang |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir et al. |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz et al. |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0149803 A1 | 6/2010 | Nakano et al. |
| 2010/0161642 A1 | 6/2010 | Chen et al. |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 * | 3/2013 | Pereg ................ G06F 17/30672 707/728 |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 * | 11/2013 | Kruel ..................... H04L 51/32 704/9 |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0059030 A1 | 2/2014 | Hakkani-Tur et al. |
| 2014/0081619 A1 | 3/2014 | Solntseva et al. |
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 * | 9/2014 | Teevan ............. G06F 17/30722 707/706 |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Waibel et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |

(56) References Cited

U.S. PATENT DOCUMENTS

| | | | |
|---|---|---|---|
| 2015/0161114 | A1 | 6/2015 | Buryak et al. |
| 2015/0161115 | A1 | 6/2015 | Denero et al. |
| 2015/0161227 | A1 | 6/2015 | Buryak et al. |
| 2015/0213008 | A1 | 7/2015 | Orsini et al. |
| 2015/0228279 | A1 | 8/2015 | Moreno et al. |
| 2015/0293997 | A1* | 10/2015 | Smith ............... H04L 51/32 707/749 |
| 2015/0363388 | A1 | 12/2015 | Green et al. |
| 2016/0041986 | A1* | 2/2016 | Nguyen ............. G06Q 50/01 707/711 |
| 2016/0048505 | A1 | 2/2016 | Tian et al. |
| 2016/0092603 | A1 | 3/2016 | Rezaei et al. |
| 2016/0117628 | A1 | 4/2016 | Brophy et al. |
| 2016/0162473 | A1 | 6/2016 | Hedley et al. |
| 2016/0162477 | A1 | 6/2016 | Orsini et al. |
| 2016/0162478 | A1 | 6/2016 | Blassin et al. |
| 2016/0162575 | A1 | 6/2016 | Eck et al. |
| 2016/0177628 | A1 | 6/2016 | Juvani |
| 2016/0188575 | A1 | 6/2016 | Sawaf |
| 2016/0188576 | A1 | 6/2016 | Huang et al. |
| 2016/0188703 | A1 | 6/2016 | Zhang et al. |
| 2016/0217124 | A1 | 7/2016 | Sarikaya et al. |
| 2016/0239476 | A1 | 8/2016 | Huang et al. |
| 2016/0267073 | A1 | 9/2016 | Bahgat et al. |
| 2016/0299884 | A1 | 10/2016 | Chioasca et al. |
| 2016/0357519 | A1 | 12/2016 | Vargas et al. |
| 2017/0011739 | A1 | 1/2017 | Huang et al. |
| 2017/0083504 | A1 | 3/2017 | Huang |
| 2017/0169015 | A1 | 6/2017 | Huang |
| 2017/0177564 | A1 | 6/2017 | Rottmann et al. |
| 2017/0185583 | A1 | 6/2017 | Pino et al. |
| 2017/0185586 | A1 | 6/2017 | Rottmann et al. |
| 2017/0185588 | A1 | 6/2017 | Rottmann et al. |
| 2017/0270102 | A1 | 9/2017 | Herdagdelen et al. |

OTHER PUBLICATIONS

Final Office Action dated Jul. 1, 2016, for U.S. Appl. No. 14/302,032 of Herdagdelen, A., filed Jun. 11, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Mar. 10, 2016, for U.S. Appl. No. 14/621,921 of Huang, F., filed Feb. 13, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Jul. 18, 2016, for U.S. Appl. No. 14/621,921 of Huang, F., filed Feb. 13, 2015.
Notice of Allowance dated Nov. 30, 2016, for U.S. Appl. No. 14/302,032 of Herdagdelen, A., filed Jun. 11, 2014.
Sutskever, I., et al., "Sequence to sequence learning with neural networks," Advances in Neural Information Processing Systems, pp. 3104-3112, 2014.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/980,654 of Pino, J. et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Final Office Action dated Jun. 16, 2017, for U.S. Appl. No. 14/586,022 of Huang, F. et al., filed Dec. 30, 2014.
Notice of Allowance dated Jun. 6, 2017, for U.S. Appl. No. 14/981,794 by Rottman, K., et al., filed Dec. 28, 2015.
Non-Final Office Action dated Jun. 26, 2017, for U.S. Appl. No. 15/445,978 of Herdagdelen, A., filed Feb. 28, 2017.
Non-Final Office Action dated Dec. 29, 2016, for U.S. Appl. No. 14/586,049 of Huang, F. et al., filed Dec. 30, 2014.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
Zamora, J.D., et al., "Tweets language identification using feature weightings," Proceedings of the Twitter language identification workshop, Sep. 16, 2014, 5 pages.
Extended European Search Report for European Application No. 16161095.1, dated Feb. 16, 2017, 4 pages.
U.S. Appl. No. 15/644,690 of Huang, F. et al., filed Jul. 7, 2017.
Notice of Allowance dated Jul. 12, 2017, for U.S. Appl. No. 14/981,794 by Rottman, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
Notice of Allowance dated Mar. 1, 2017, for U.S. Appl. No. 14/981,769 by Rottmann, K., et al., filed Dec. 28, 2015.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 28, 2017, for U.S. Appl. No. 14/586,049 by Huang, F., et al., filed Dec. 30, 2014.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.
U.S. Appl. No. 15/696,121 of Rottmann, K., et al., filed Sep. 5, 2017.

(56) References Cited

OTHER PUBLICATIONS

Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowance dated Oct. 10, 2017 for U.S. Appl. No. 15/275,235 for Huang, F. et al., filed Sep. 23, 2016.

* cited by examiner

ANALYZING LANGUAGE DEPENDENCY STRUCTURES

BACKGROUND

Users spend an immense amount of time interacting with content on social media websites. On one popular social media website, for example, over a billion active users spend a total of over ten million hours each month interacting with the website. These users often produce hundreds of millions of content items, e.g. "posts," each day. When users access such social media websites, the website can select content items such as other users' posts, news feeds, event notifications, and advertisements to display to the users. Selecting content items that users are likely to find helpful or relevant increases the chances that users will interact with those content items and that they will return to the website in the future.

Over time, topics and actions discussed on social media fall into and out of favor. Topics or actions that are currently being performed or discussed are referred to as "trending." Determining trending topics and actions can be extremely valuable in selecting content items or in convincing advertisers to utilize social media channels to reach potential customers. For example, trending topics and actions can be helpful to inform marketing decisions, to provide recommendations for other users, to predict resource usage, to draw analogies to other similar topics and actions, etc. However, classifying a topic or action as trending can be difficult. For example, trends that may exist for a segment of social media contributors, such as those who share a particular geographical location, may not be readily apparent from an analysis of general social media posts. Furthermore, performing an in-depth analysis on combinations of the millions of social media posts that are created every hour can become computationally intractable.

DETAILED DESCRIPTION

Figure 1:
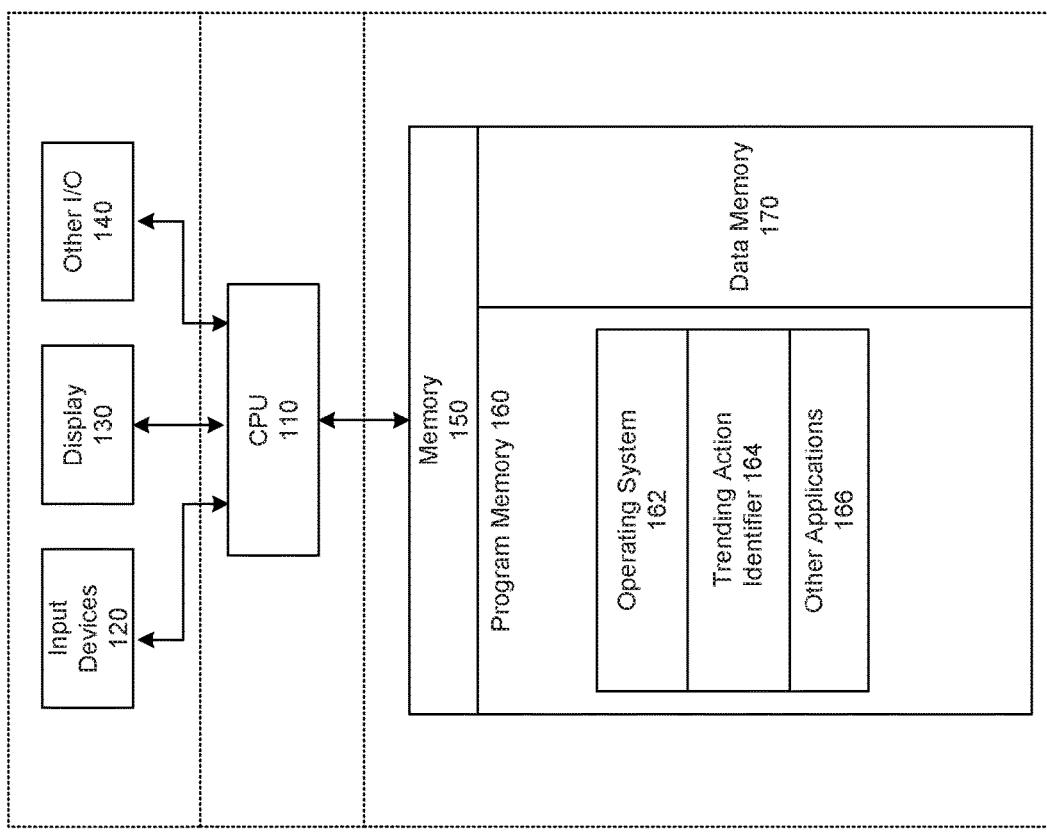
FIG. 1 is a block diagram illustrating an overview of devices on which some implementations of the disclosed technology can operate.

A multilingual business intelligence system is disclosed that is configured to identify trending actions by analyzing language dependency structures in a group of content items that match a query. In various implementations, queries specify one or more of: action keywords or identifiers, action target keywords or identifiers, or additional criteria. The multilingual business intelligence system can locate content items that match the query. For one or more content items, the multilingual business intelligence system can generate a language dependency structure that identifies the actions and action targets in that content item. The multilingual business intelligence system can use the dependency structures to generate statistics that are responsive to the query.

A "content item," also referred to as a "post," as used herein, can be any item including text, images, audio, video, or other multi-media, that potentially contains an identification of an action. As examples, a post can be anything used in a social media site such as a wall post, comment, status update, message, fan message, news story, event, or other item that can contain sentences or action identifiers. As used herein, an "action" is any identifier, such as one or more words, a set of characters, pointer, etc., within a language snippet corresponding to something that can be performed. In various implementations, actions are: any verb or verb phrase, any verb or verb phrase excluding a defined list of verbs or verb phrases; or identifiers corresponding to a closed set of actions such as—feeling, watching, reading, listening to, drinking, eating, playing, traveling to, looking for, and exercising; or a combination thereof. As used herein, an "action target" is any identifier, such as one or more words, a set of characters, pointer, etc., within a language snippet corresponding to one or more objects of an action, i.e. what that action is being performed in relation to, how it is being performed, when it is being performed, where it is being performed, etc. In various implementations, action targets are: any noun or noun phrase, any adjective or adjective phrase; or identifiers corresponding to a closed set of action targets such as a list of—feelings, movies, TV shows, books, magazines, websites, articles, music, radio programs, speeches, foods/drinks, games, locations, etc.; or a combination thereof.

Queries can be in one of four categories: (1) specifying one or more actions, (2) specifying one or more action targets, (3) specifying both of one or more actions and one or more action targets, or (4) specifying neither of an action nor an action target. Examples of the type of query in each category are: (1) "How many people have reported watching something in the last day?" (2) "What are the ages of people that have reported doing something in relation to comedy in the last week?" (3) "What is the ratio of women to men that have reported going to the mall today?" (4) "What are the top five actions people in San Francisco reported taking in the past month?" Queries can be specified in this type of natural language format or can be specified in a more query-specific format such as "SELECT trendingActions WHERE action=actionID_1 and postAuthorAge>12 and postAuthorAge<20." In some implementations, the multilingual business intelligence system can build queries automatically based on input to a form, script, or other method of providing query parameters.

Based on keywords and identifiers from the query, the multilingual business intelligence system can select a set of posts relevant to the query. The multilingual business intelligence system can select relevant posts where: the posts have particular query-specified content such as a keyword, URL, image, video, etc.; the posts have specific externals, such as where the posts are published, when they were published, how long they are, etc.; the posts' authors are associated with specified criteria such as a specified location, a specified age range, a particular gender, a particular language, a specified belief, a particular organization or group, etc. Additional details regarding obtaining posts relevant to a query are discussed below in relation to FIG. 5.

The multilingual business intelligence system can generate statistics responsive to the query by determining which posts match the query and computing statistics accordingly. Computed statistics can be any data specified in the query. In some implementations, computed statistics can be a relative value such as a count, percentage, or ratio within a group (i.e. what percentage of the posts by authors in Los Angeles match action criteria). In some implementations, computed statistics can be an absolute count (i.e. how many posts match action criteria). In some implementations, computed statistics can identify specific posts, post attributes, or post authors (i.e. provide a list of users who reported visiting www.example.com or provide a time-based graph for the number of users who reported visiting www.example.com). In some implementations, computed statistics can provide currently trending actions or action targets. In some implementations, computed statistics can provide currently trending topics (see U.S. patent application 14/586,049, entitled "Contrastive Multilingual Business Intelligence", filed Dec. 30, 2014) using a group of posts identifying a particular action or action target as at least one of the comparative groups (e.g. what are the trending topics for users in Chicago vs. users in Dallas who reported buying a car in the past year.) In some implementations, computed statistics can include other calculations, data representations, comparisons, etc. Additional details regarding generating statistics that are responsive to a query are discussed below in relation to FIG. 6.

The multilingual business intelligence system can obtain information directly from query results such as which users, how many users, or what type of users, are reporting what actions or type of actions. Alternatively or in addition, the multilingual business intelligence system can use identified trending actions and corresponding posts to select content items or to determine appropriate advertising for particular users. This can be accomplished by identifying a category, such as a post location or user attribute, (e.g. age, gender, associated location, friend network, associated topic, etc.), for the trending action/action target. When a web page associated with that category (e.g. a user classified in the category is identified as viewing that web page, a topic on the web page has that category, etc.) is served, the multilingual business intelligence system can incorporate in that web page content associated with the trending action or customized for the trending action/action target (e.g. an advertisement, social media content items that may be of interest, etc.). For example, the multilingual business intelligence system can identify that users in Chicago (category) are listening (action) to a particular type of music (action target). When subsequent users who have been identified as being in Chicago interact with a social media web site, the multilingual business intelligence system can customize ads for an online music provider to highlight that the identified type of music. As another example, the multilingual business intelligence system can identify that posts to football fan pages include a trending action of "Seahawks." Content selected for football fan pages can be selected to include content items tagged as relating to the Seahawks.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that identifies trending actions. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, trending action identifier 164, and any other application programs 166. Memory 150 also includes data memory 170 that can include posts, action identifications and mappings, action target identifications and mappings, post classifications and keyword indexes, post author information, trending action or action target to content item mappings, stored statistics, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
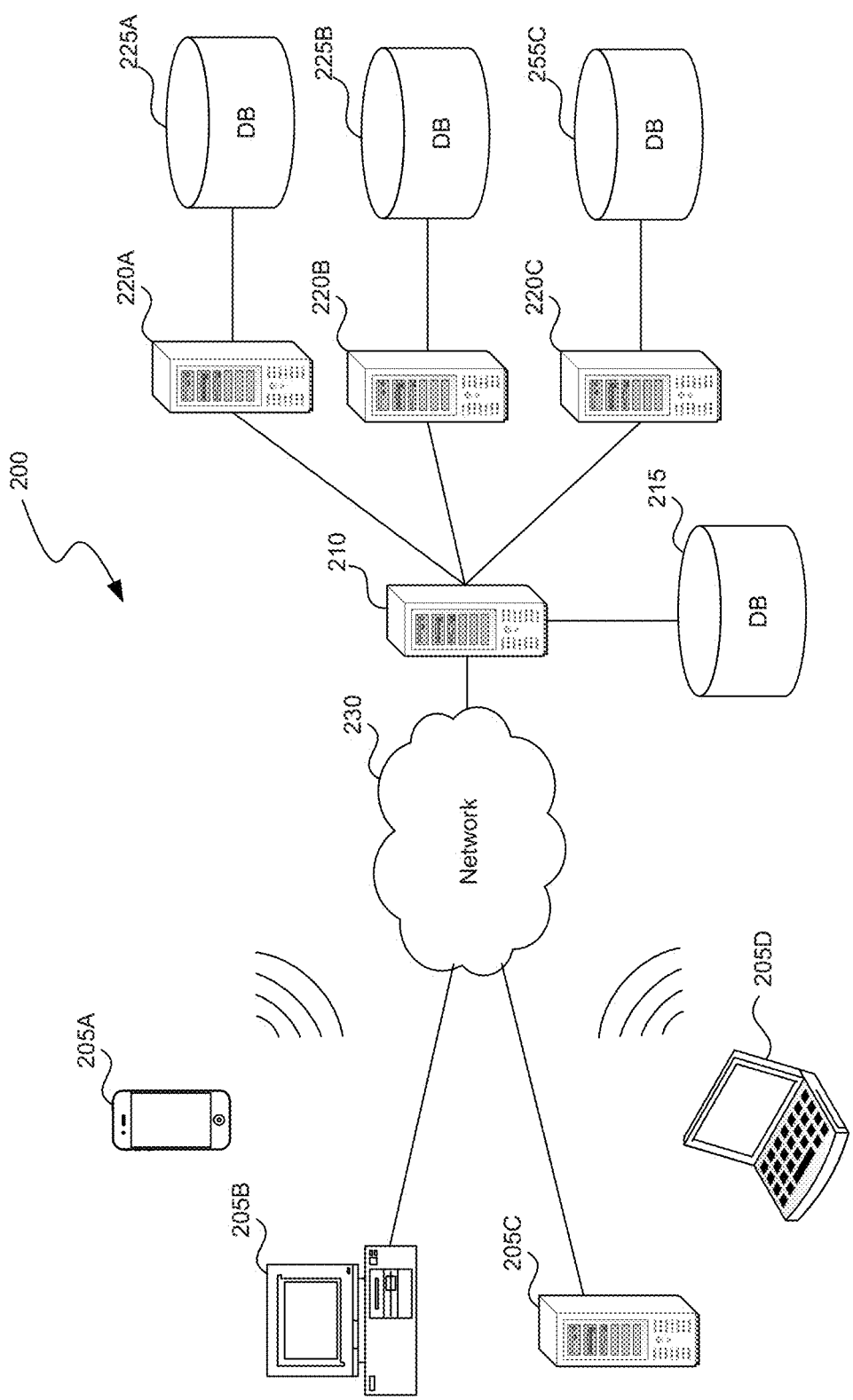
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as posts, action identifications and mappings, action target identifications and mappings, post classifications and keyword indexes, post author information, trending action or action target to content item mappings, and stored statistics. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
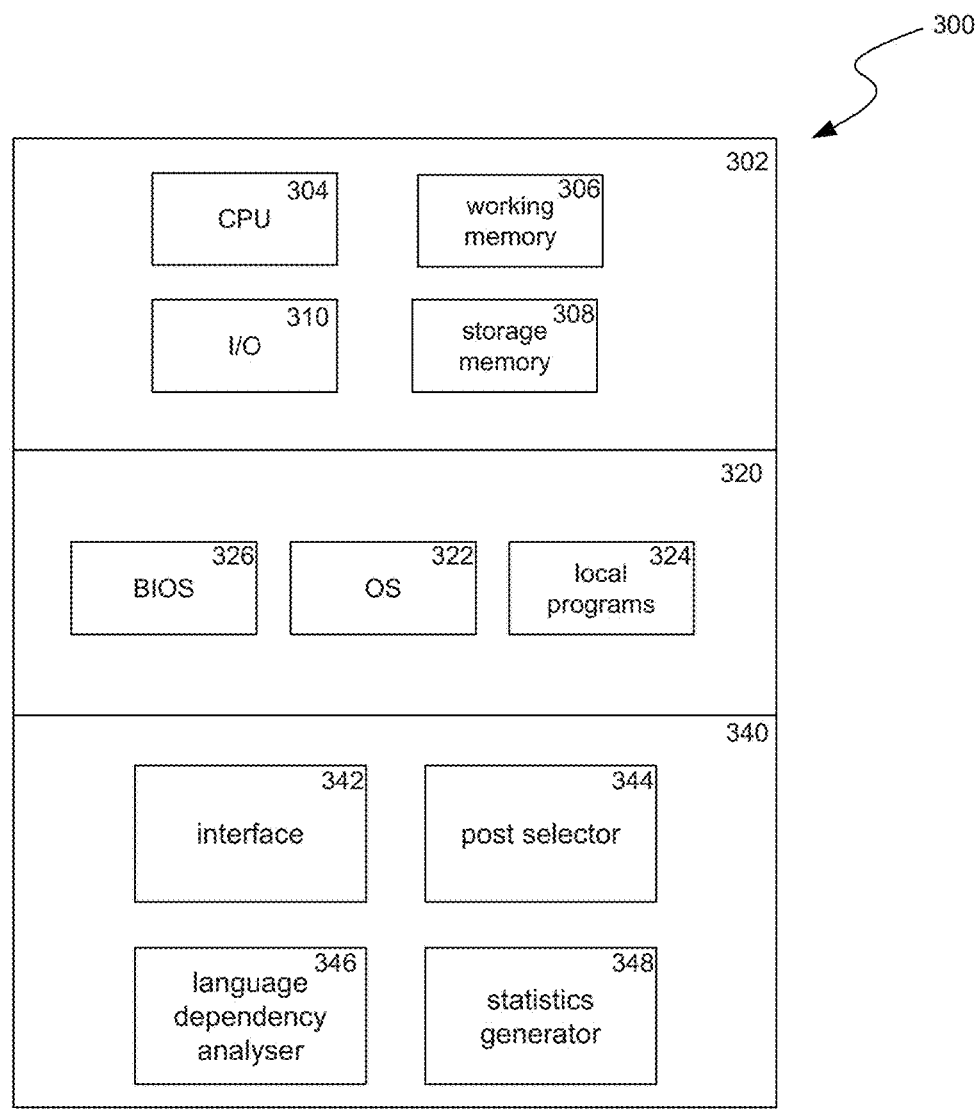
FIG. 3 is a block diagram illustrating components which, in some implementations, can be used in a system employing the disclosed technology.

FIG. 3 is a block diagram illustrating components 300 which, in some implementations, can be used in a system employing of the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include post selector 344, language dependency analyzer 346, statistics generator 348, and components which can be used for controlling and receiving data from the specialized components, such as interface 342.

Post selector 344 can be configured to receive a query through interface 342 and select posts relevant to the query. Relevant posts can be selected based on keywords or identifiers extracted from, or matched to, the query. In some implementations, the query can explicitly state keywords for which posts are to be searched. For example, a query can be entered using two fields where a first field allows a user to enter action keywords and a second field allows a user to enter action target keywords. In some implementations, posts can be structured such that particular portions of the posts are identified as the action portion or the action target portion. In these implementations, and where the query specifies a specific action or action target, posts can be searched by searching the relevant portion of posts for the specified action or action target. In some implementations, a query can be unstructured, and post selector 344 automatically extracts keywords from the query. For example, post selector 344 can be configured to identify and extract action (verb) keywords as potential actions and object (noun) or descriptive (adjective) keywords as potential action targets. In some implementations, a set of actions or action targets are defined with corresponding identifiers. For example, the set of actions: feeling, watching, reading, listening to, drinking, eating, playing, traveling to, looking for, exercising, and buying can each be associated with a corresponding identifier. In some implementations, when users add a post to a social media web site, they can tag, or otherwise specify in the post, a relevant action or action target. This will associate the post with a corresponding action identifier or action target identifier. As used herein, such a specified set of actions are referred to as "minutia."

Post selector 344 can execute a search for a set of posts matching the identified keywords or identifiers. For example, posts could be organized in a SQL type database and for a set of identified keywords K, a search could be executed as: SELECT*FROM postTable, AS posts WHERE postKeyword IN K. Selecting posts relevant to a query is discussed below in more detail in relation to FIG. 5.

Language dependency analyzer 346 can receive a post, such as a post selected by post selector 344, and determine for each sentence within that post a language dependency structure. Language dependency analyzer 346 can accomplish this by dividing a post into sentences. For each sentence, language dependency analyzer 346 can identify whether that sentence has one or more actions and what is the target or what are the targets of those actions. In some implementations, language dependency analyzer builds dependency structures using a classifier such as a support vector machine (SVM) or neural network. Analyzing language dependencies is discussed below in more detail in relation to FIG. 6.

Statistics generator 348 can generate a response to the query received through interface 342 for which a group of posts was selected by post selector 344. Generated "statistics" as used herein can be any set of data, including numbers, images, graphs, data structures, text, audio, etc., that is generated responsive to the query. Depending on the type of query, statistics generator 348 can, using the language dependencies identified by language dependency analyzer 346, determine which posts or sentences within posts match: action(s) specified in the query, if any; action target(s) specified in the query, if any; and additional criteria specified in the query, if any. In some implementations, statistics generator 348 can compute statistics for the determined matching posts or sentences as an absolute count. In various implementations, statistics generator 348 can compute statistics for the determined matching posts or sentences as a comparison to other posts or sentences from the group of posts selected by post selector 344, a random set of posts, a representative selection of posts, or all known posts within a social media system. In some implementations, statistics generator 348 can compute statistics as an answer to an additional question of the query. For example, the query can request a graph of the ages of users who authored posts that report performing a specified action. Generating statistics corresponding to a query is discussed below in more detail in relation to FIG. 6.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
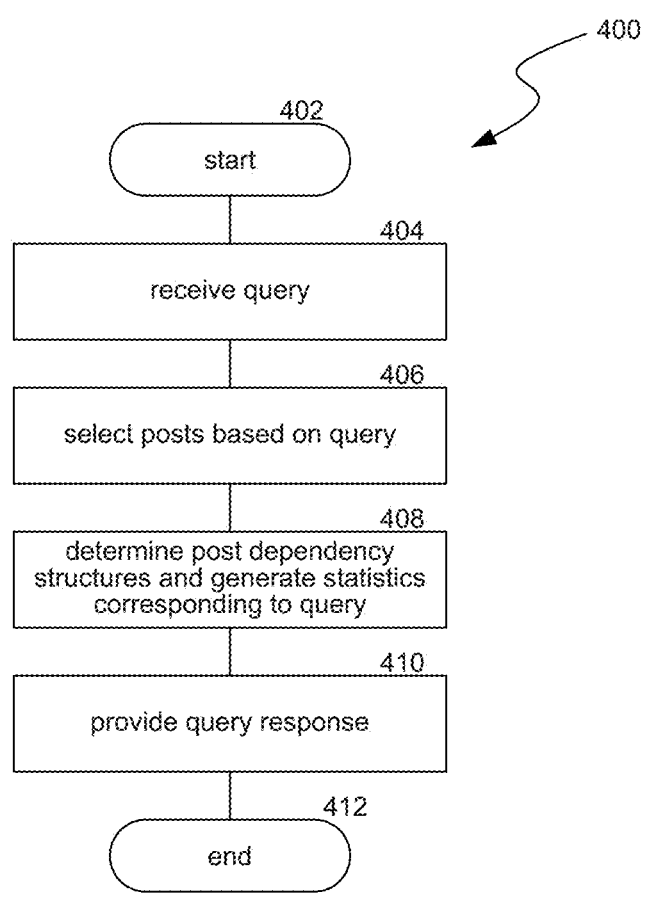
FIG. 4 is a flow diagram illustrating a process used in some implementations for identifying trending actions for a query.

FIG. 4 is a flow diagram illustrating a process 400 used in some implementations for identifying trending actions for a query. Process 400 begins at block 402 and continues to block 404. At block 404, a query is received. The received query can specify either, both, or neither of one or more actions and one or more action targets. Actions and action targets can be specified identifiers, such as a set of characters where each set can be mapped to an action or action target, or they can be specified as keywords. Such identifiers can be referred to herein as "minutia identifiers." The received query can be informal, such as a natural language sentence, can be in the form of a search string, such as a SQL statement, or can be a set of inputs from a form or wizard, such as the fields of a web site.

The received query can identify a desired result or result type based on matching posts or parts of posts (e.g. post sentences). For example, identified desired results can be a list of actions, action targets, or action/action target pairs, a count, a percentage, a ratio, a graph, a chart, a table, a map, or specific information related to the matching posts or post parts. In some implementations, queries can request information about post characteristics that match parameters. In some implementations, the query can specify constraint parameters for selecting posts. In some implementations, query result parameters or post selection parameters specify author location, age, gender, race, belief, biometric, group association, friend relationships, type of content the author generally interacts with, etc. For example, a query could request the average age of users in Moscow who have reported exercising in the last two months. In some implementations, query result parameters or post selection parameters can specify qualities about posts such as: keywords, phrases, categories, or labels; length; language; post classifications assigned by the author or assigned by a computing system based on an analysis of the posts, etc. For example, a query could request a map of the locations of users who reported feeling adventurous and included in their post the word "travel." In some implementations, specified keywords, phrases, categories, labels, or classifications can include both the words specified and equivalents or variations determined by the system. In some implementations, query result parameters or post selection parameters can specify qualities about externals of posts, such as where they are posted, when they were posted, what type of device they were posted from, a range of IP addresses the posts came from, etc. For example, a query could request the top five fan pages that have received the most posts, within the last week, where, in the posts, users have reported interacting with a comedy type action target.

At block 406 a set of posts relevant to the query is selected. Posts can be selected based on action and action target keywords identifiers from the query of block 404, as well as any other parameters specified in the query. Selecting posts relevant to a query is discussed below in more detail in relation to FIG. 5.

At block 408 language dependencies for the selected set of posts are determined and statistics corresponding to the query are generated. Language dependencies can be determined by first dividing each post into sentences. Then for each sentence, the action and action target, if either exists, can be identified. Statistics can then be generated by identifying sentences where the action matches any actions specified in the query and the action target matches any action targets specified in the query. Additional information to respond to the query can be gathered for matching posts, such as information about post authors or about post externals. Creating language dependencies and generating statistics corresponding to the query are discussed in more detail below in relation to FIG. 6.

At block 410 a response is created and provided responding to the query. The query response can integrate statistics generated at block 408 to conform to the format requested in the query. For example, a query can request results as a map, on a city scale, of user locations for users that are performing a particular action. In this example, the statistics generated at block 408 could be a list of user IDs of users who created posts reporting the specified action. At block 410 in this example, city locations for user accounts associated with each user ID can be retrieved and drawn onto a map to provide as a result of the query. The business intelligence system can be configured to generate any type of response such as textual or numerical data, XML or other encoded or tagged data, graphs, tables, maps, charts, images, slides, or other data structures. In some implementations, a set of templates can be defined, either through the query or independently, and the statistics generated at block 408 can be provided to fill in a selected template. Process 400 then continues to block 412, where it ends.

Figure 5:
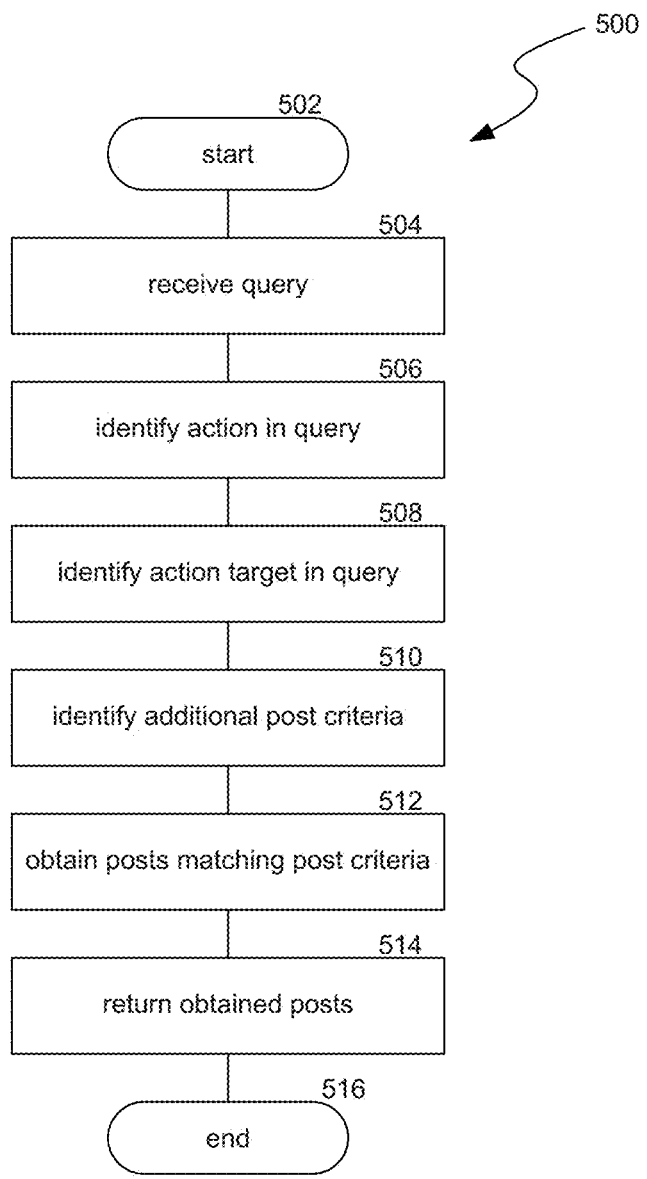
FIG. 5 is a flow diagram illustrating a process used in some implementations for selecting a set of posts based on a query.

FIG. 5 is a flow diagram illustrating a process 500 used in some implementations for selecting a set of posts based on a query. Process 500 begins at block 502 and continues to block 504. At block 504 a query is received. As discussed above, a query can be one of four types: a type specifying one or more actions and one or more action targets, a type specifying one or more actions; a type specifying one or more action targets, or a type specifying neither an action nor an action target.

At block 506 actions specified in the query are identified. In some implementations, actions are identified by locating within the query identifiers matching one of a set of action identifiers. For example, the set of action identifiers can correspond to the minutia: feeling, watching, reading, listening to, drinking, eating, playing, traveling to, looking for, and exercising. Action identifiers can comprise a type of data structure such as a string, an integer or other number, a pointer, an XML tag, etc. In some implementations, actions can be identified from the query by extracting keywords. In some implementations, extracting keywords can be accomplished by identifying verbs. In some implementations, the action keywords can be extracted by matching them to a set of defined keywords. In some implementations, extracting keywords can be accomplished by identifying verbs that do not exist on an action exclusion list. An action exclusion list can include verbs that are considered less interesting such as "is," "be," "am," "are," "have," etc.

At block 508 action targets specified in the query are identified. Similarly to actions, action targets, in some implementations, can be identified by locating within the query identifiers matching one of a set of action target identifiers. Action target identifiers can comprise a type of data structure such as a string, an integer or other number, a pointer, an XML tag, etc. In some implementations, action targets can be identified from the query by extracting keywords. In some implementations, extracting keywords can be accomplished by identifying nouns or adjectives. In some implementations, the action targets can be extracted by matching them to a set of defined action target keywords. In some implementations, extracting keywords can be accomplished by identifying nouns that do not exist on an action target exclusion list. In some implementations, identifying actions or action targets in the query can be performed by generating a dependency structure, as discussed in more detail below, for the query.

At block 510 additional criteria that may be specified in the query can be identified. Additional criteria can be specified as search parameters for the content of posts, for characteristics of post authors, or for the externals of posts. Parameters about posts can include: keywords, phrases, categories or labels; length; language; post classifications assigned by the author or assigned by a computing system based on an analysis of the posts, etc. Parameters about a source or author of posts can include a location, age, gender, race, belief, biometric, group association, friend relationships, type of content the author generally interacts with, etc. Parameters about externals of posts can include where they are posted, when they were posted, what type of device they were posted from, a range of IP addresses the posts came from, etc. Additional post criteria are likely to be specified at least when the query does not specify an action and does not specify an action target.

At block 512 a set of one or more posts can be obtained that match any action, action target, or additional criteria parameters identified at blocks 506-510. This can be accomplished by executing a query based on the parameters from blocks 506-510. In some implementations, parameters can be distilled into a set of keywords and posts can be obtained by searching for posts that contain one or more of the keywords. In some implementations, parameters can be used to search for posts that contain a keyword and also that satisfy other criteria such as a timeframe or author location or age. In some implementations, posts can be stored having portions of the posts already identified as actions and action targets. In these implementations, when a query specifies an action or an action target, the corresponding parts of stored posts can be searched to locate matches. Some of the obtained posts can include at least one sentence that specifies at least one action and at least one action target. These posts are referred to herein as "action posts," and sentences within action posts that specify the action(s) and action target(s) are referred to herein as "action sentences." At block 514 the set of obtained posts is returned. At block 516, process 500 ends.

Figure 6:
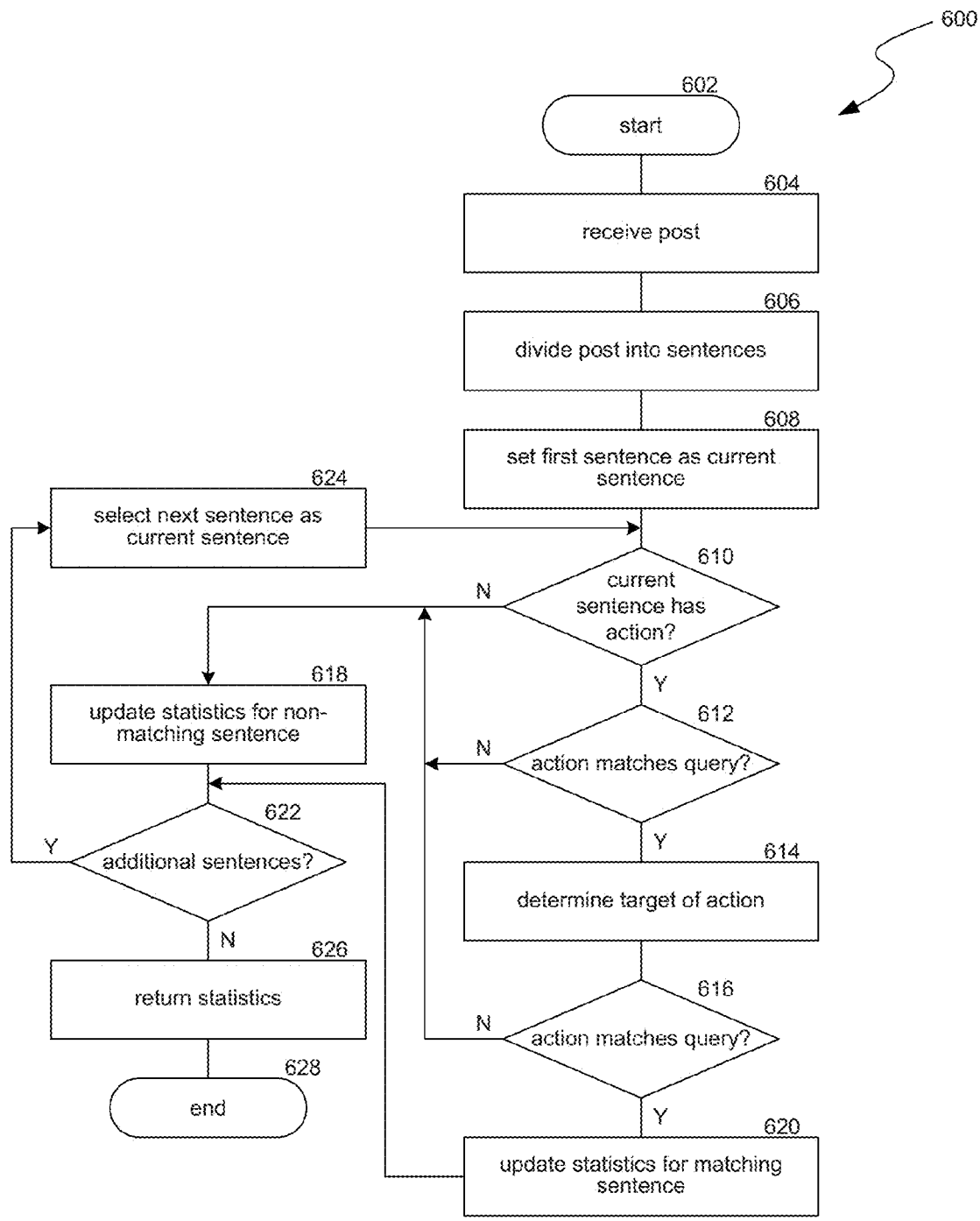
FIG. 6 is a flow diagram illustrating a process used in some implementations for generating statistics in response to a query in relation to a selected set of posts.

FIG. 6 is a flow diagram illustrating a process 600 used in some implementations for generating statistics in response to a query in relation to a selected set of posts. Process 600 begins at block 602 and continues to block 604. At block 604 a post is received. This can be one of the posts selected using process 500.

At block 606 the received post is divided into individual sentences. Sentences can be identified based on punctuation, structure, word usage, etc. In various implementations, sentences can be grammatically correct sentences or can be any set of consecutive words without requiring any specific structure (e.g. an n-gram). At block 608, a first of the post sentences can be set as a current sentence.

At block 610, process 600 computes whether the current sentence has an action. In social media contexts, sentences may not include an action. For example, a single word post "Absolutely!" would have one sentence that does not include an action. An action for the current sentence can be identified by locating certain words or word types such as verbs, words that end with "ing," or words that are on a predefined action word list. In some implementations, methods such as using neural networks, SVMs, or other natural language processing and classification techniques can be used to identify and classify portions of sentences. If the current sentence does not include an action, process 600 continues to block 618. If an action in the current sentence is identified, process 600 continues to block 612.

At bock 612, where the query specifies an action, the action identified at block 620 is compared to the action in the query. In some implementations, the query may not specify an action so block 612 would not be performed. If the action identified at block 610 matches the action in the query, process 600 continues to block 614. Otherwise, process 600 continues to block 618.

At block 614, process 600 identifies the target or targets of the action or actions identified at block 610. Similarly to identifying an action, an action target of the current sentence can be identified by locating certain words or word types such as nouns or adjectives or words that are on an action target list. In some implementations, methods such as using neural networks, SVMs, or other natural language processing and classification techniques can be used to identify and classify the action target portions of sentences. Where the sentence includes one or more actions, each with one or more corresponding action targets, a resulting dependency structure can correlate each action with its corresponding action targets.

At block 616, where the query specifies an action target, the action target identified at block 614 is compared to the action target in the query. In some implementations, the query may not specify an action target, so block 614 would not be performed. If the action target identified at block 614 matches the action target in the query, process 600 continues to block 620. Otherwise, process 600 continues to block 618.

At block 618, process 600 updates statistics for the sentence not matching the query. The non-matching statistics can be a count of sentences that do not match the query. In some implementations the non-matching statistics can be updated across executions of process 600 for different posts identified by process 500. The non-matching statistics can be stored on a sentence level (i.e. a number, percentage, ratios, etc. of sentences that do not match the query) or on a post level across executions of process 600 (i.e. a number, percentage, ratios, etc. of posts that do not match the query).

At block 620, process 600 updates statistics for a sentence that match the query. In some implementations, the matching statistics can be a count of sentences that match the query. In some implementations, the statistics can be based on a count of the actions, action targets, or each action and action target paring that match the query. As an example, where a query is "what are people watching" a count can be kept of each action target paired with the action "watching" in a dependency structure. As another example, where a query is "what are people doing in relation to car company X" a count can be kept of each action where the action target is car company X. As a further example, where a query is "what are people doing," a count can be kept for each action/action target pair. For any type of query, any of action statistics, action target statistics, or action pair statistics, or other statistics such as matching post or sentence counts, can be kept.

Similarly to the non-matching statistics, in some implementations, the matching statistics can be updated across executions of process 600 for different posts identified by process 500. The matching statistics can be stored on a sentence level (i.e. a number, percentage, ratios, etc. of sentences that match the query) or on a post level across executions of process 600 (i.e. a number, percentage, ratios, etc. of posts that match the query). In some implementations, the matching statistics can be updated according to a question specified in the query. This can include gathering additional information about the content of the post received at block 604, about the author of that post, or about externals to that post. For example, the query could specify the average age of users who are users, or are friends of users, who authored posts reporting that they are going home within one week prior to December 25. When a matching post is discovered (a post, authored between December 18-25, with the action "going" and the action target "home"), at block 620 the friends of the user who authored the post can be identified and their average age can be calculated. This average age can be combined with an average age found in other executions of process 600 where another post was located that matches the query parameters.

The query can request information, coupled with actions or action targets, about post authors such as, location, age, gender, race, belief, biometric, group association, friend relationships, type of content the author generally interacts with, etc. Other types of requests that be coupled with actions or action targets in a query are for the content of posts such as: keywords, phrases, categories or labels; post length, language, or classifications assigned by the author or assigned by a computing system based on an analysis of the posts, etc. For example, a query could ask for a percentage of posts in the last two hours where authors have reported watching a specific video and where the post contains the keyword "happy." Additionally, types of requests that be coupled with actions or action targets in a query are for externals of posts such as, where they are posted, when they were posted, what type of device they were posted from, a range of IP addresses the posts came from, etc. For example, a query could request a ratio of the types of devices that authors send posts from where the posts report feeling frustrated with their mobile phones.

At block 622 process 600 determines whether there are additional sentences that have not been evaluated from the post received at block 604. If there are additional sentences, process 600 continues to block 624 where the next sentence is set as the current sentence to be operated on by the loop between blocks 610-622. If there are no additional sentences, meaning that all the sentences of the post received at block 604 have been evaluated, process 600 continues to block 626.

At block 626 statistics generated during process 600, or across multiple executions of process 600 are returned. In some implementations, the non-matching statistics of block 618 and the matching statistics of block 620 can be combined, such as in a ratio or percentage, to create the returned statistics of process 600. In some implementations, the returned statistics provide the items: actions, action targets, or actions and action target pairs, that have the highest count (i.e. those with a count above a threshold). The number of returned items can be specified in the query, can be a default value, can be those that are in a cluster a threshold amount above a next highest cluster of items, etc. Which type of items (actions, action targets, action and action target pairs, or a combination thereof) is returned can be based on what was requested in the query. For example, if the query requested the top 5% of trending action targets where posts specify the action as "reading," then only action target type items would be tracked or returned by process 600. Process 600 then continues to block 628, where it ends.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method, performed by a computing system, for generating trending action statistics that match a query, comprising:
   receiving, by a server, the query identifying one or more of: a search action or a search action target;
   selecting a set of posts relevant to the query, the set of posts comprising one or more action posts that contain at least one sentence that specifies a post action and a post action target;
   for one or more selected action posts of the one or more action posts:
      dividing the selected action post into one or more sentences;
      creating, for at least one action sentence of the one or more sentences, a dependency structure correlating a performed action identified in the action sentence with an action target identified in the action sentence, wherein the identification of the performed action comprises a first identifier, within the action sentence, corresponding to the performed action, and wherein the identification of the action target comprises a second identifier, within the action sentence, corresponding to one or more objects of the action sentence;
      determining, based on the dependency structure, that the selected action post matches the query by:
         determining that the search action specified in the query matches the performed action identified in the dependency structure; or
         determining that the search action target specified in the query matches the action target identified in the dependency structure;
      in response to determining that the selected action post matches the query, updating a count of matching actions or a count of matching action targets corresponding to the action or action target identified in the dependency structure;
   communicating between the server and a database to generate a response to the query by computing statistics based on the count of matching actions or the count of matching action targets; and
   providing the response to the query.

2. The method of claim 1 wherein the received query identifies one or more search actions by specifying one or more action keywords.

3. The method of claim 1 wherein creating the dependency structure comprises identifying words on a predefined action word list.

4. The method of claim 1 wherein:
   the received query further identifies additional criteria indicating one or more of:
      author location;
      author age;
      author gender;
      author group association;
      post keywords;
      post length;
      post language;
      post location; or
      post timeframe; and
   selecting the set of posts relevant to the query is based on the additional criteria.

5. The method of claim 1 wherein selecting the set of posts relevant to the query comprises automatically identifying and extracting keywords from the query and locating posts that contain the keywords.

6. The method of claim 5 wherein identifying and extracting keywords from the query comprises:
   classifying words in the query;
   identifying, as action keywords, words with an action classification; and
   excluding, from the identified action keywords, action keywords on an action exclusion list.

7. The method of claim 1 further comprising:
   identifying, using the response to the query, a category for one or more trending actions or action targets;
   receiving a request for a web page, wherein the web page is associated with the identified category;
   selecting one or more content items that are:
      related to the one or more trending actions or action targets; or
      customized for the one or more trending actions or action targets;
   customizing the web page to include the selected one or more content items; and
   providing, in response to the request for the web page, the customized web page.

8. The method of claim 1:
   wherein the received query identifies one or more search actions by specifying one or more minutia identifiers; and
   wherein the one or more minutia identifiers correspond to a set of actions comprising: feeling, watching, reading, listening to, drinking, eating, playing, traveling to, looking for, and exercising.

9. The method of claim 1 wherein:
   the received query specifies additional information to be gathered in relation to posts matching the search action or search action target identified in the query; and
   generating a response to the query comprises:
      obtaining, in relation to each of the selected action posts, the additional information specified in the query.

10. The method of claim 9 wherein the additional information to be gathered is information about authors of posts matching the search action or search action target identified in the query.

11. The method of claim 1 wherein the computed statistics used to generate the response to the query are further based on a count of non-matching posts or non-matching sentences that, based on another dependency structure generated for each non-matching sentence, do not match the search action specified in the query or do not match the search action target specified in the query.

12. A computer-readable storage medium storing instructions that, when executed by a computing system, cause the computing system to perform operations for selecting trending action targets matching a query, comprising:
   receiving a query identifying one or more search actions;
   identifying, as search criteria, one or more keywords or one or more identifiers for the one or more search actions in the received query;
   selecting, based on the search criteria, a set of posts relevant to the query, the set of posts comprising one or more action posts that contain at least one sentence that specifies a post action and a post action target;
   for one or more selected action posts of the one or more action posts:
      creating a dependency structure for at least one action sentence in the selected action post, wherein the dependency structure correlates a performed action identified in the action sentence with an action target identified in the action sentence, wherein the identification of the performed action comprises a first identifier, within the action sentence, corresponding to the performed action, and wherein the identification of the action target comprises a second identifier, within the action sentence, corresponding to one or more objects of the action sentence;

determining, based on the dependency structure, that the selected action post matches the query by determining that at least one of the one or more search actions specified in the query matches the performed action identified in the dependency structure; and in response to determining that the selected action post matches the query, updating a count of action targets that match the query corresponding to the action target identified in the dependency structure; and providing a response to the query that identifies one or more response action targets based on the count for each of the identified one or more response action targets being above a threshold.

13. The computer-readable storage medium of claim 12 wherein the received query identifies one or more search actions by specifying one or more action keywords.

14. The computer-readable storage medium of claim 12 wherein:

the received query further identifies additional criteria indicating one or more of:
author location;
author age;
author gender;
author group association;
post keywords;
post length;
post language;
post location; or
post timeframe; and selecting the set of posts relevant to the query is based on the additional criteria.

15. The computer-readable storage medium of claim 12:
wherein selecting the set of posts relevant to the query comprises:
classifying words in the query;
identifying, as action keywords, words with an action classification; and
locating posts that contain the keywords; and
wherein identifying words with the action classification comprises excluding, from the identified action keywords, action keywords on an action exclusion list.

16. The computer-readable storage medium of claim 12 wherein the one or more search actions comprise at least one of: feeling, watching, reading, listening to, drinking, eating, playing, traveling to, looking for, exercising, or buying.

17. The computer-readable storage medium of claim 12 wherein:
the received query specifies additional information to be gathered in relation to posts matching the one or more search actions; and
the response to the query comprises:
the additional information specified in the query obtained in relation to each of the selected action posts.

18. The computer-readable storage medium of claim 17 wherein the additional information to be gathered is information about authors of posts matching the one or more search actions identified in the query.

19. A system for identifying trending actions matching a query, comprising:
one or more processors;
a memory;
an interface configured to receive a query identifying one or more search action targets;
a post selector configured to:
identify, as search criteria, one or more keywords or one or more identifiers for the one or more search action targets in the received query; and
select, based on the search criteria, a set of posts relevant to the query, the set of posts comprising one or more action posts that contain at least one sentence that specifies a post action and a post action target;
a language dependency analyzer configured to:
for one or more selected action posts of the one or more action posts, create a dependency structure for at least one action sentence in the selected action post, wherein the dependency structure correlates a performed action identified in the action sentence with an action target identified in the action sentence, wherein the identification of the performed action comprises a first identifier, within the action sentence, corresponding to the performed action, and wherein the identification of the action target comprises a second identifier, within the action sentence, corresponding to one or more objects of the action sentence; and
a statistics generator configured to:
determine, based on the dependency structure, that the selected action post matches the query by determining that at least one of the one or more search action targets specified in the query matches the action target identified in the dependency structure; and
in response to determining that the selected action post matches the query, update a count of actions that match the query corresponding to the action identified in the dependency structure; and
providing a response to the query that identifies one or more actions based on the count for each of the identified one or more actions being above a threshold.

20. The system of claim 19 wherein:
the received query specifies additional information to be gathered in relation to posts matching the one or more search action targets in the query;
the response to the query comprises:
the additional information specified in the query obtained in relation to each of the selected action posts; and
the additional information to be gathered is information about authors of posts matching the one or more search action targets identified in the query.

* * * * *